(12) United States Patent
Kwon et al.

(10) Patent No.: US 12,289,006 B2
(45) Date of Patent: Apr. 29, 2025

(54) APPARATUS FOR PROTECTING BATTERY PACK

(71) Applicants: HYUNDAI MOTOR COMPANY, Seoul (KR); KIA CORPORATION, Seoul (KR); YURA CORPORATION CO., LTD., Seongnam-si (KR)

(72) Inventors: Jae Min Kwon, Incheon (KR); Kang Woo Bae, Suwon-si (KR); Chan Young Jung, Yongin-si (KR); Bo Ko Choi, Cheonan-si (KR)

(73) Assignees: HYUNDAI MOTOR COMPANY, Seoul (KR); KIA CORPORATION, Seoul (KR); YURA CORPORATION CO., LTD., Seongnam-si (KR)

( * ) Notice: Subject to any disclaimer, the term of this patent is extended or adjusted under 35 U.S.C. 154(b) by 463 days.

(21) Appl. No.: 17/960,377

(22) Filed: Oct. 5, 2022

(65) Prior Publication Data
US 2023/0114460 A1    Apr. 13, 2023

(30) Foreign Application Priority Data

Oct. 8, 2021  (KR) .................. 10-2021-0133565

(51) Int. Cl.
*H02J 7/00*     (2006.01)
*H01M 10/44*    (2006.01)
*H01M 10/48*    (2006.01)
*H01M 50/204*   (2021.01)
*H01M 50/296*   (2021.01)

(52) U.S. Cl.
CPC ......... *H02J 7/0045* (2013.01); *H01M 10/441* (2013.01); *H01M 10/482* (2013.01); *H01M 50/204* (2021.01); *H01M 50/296* (2021.01); *H01M 2220/20* (2013.01); *H02J 2207/20* (2020.01)

(58) Field of Classification Search
CPC .... H02J 7/0045; H02J 2207/20; H02J 7/0034; H02J 7/0031; H01M 10/441; H01M 10/482; H01M 50/204; H01M 50/296; H01M 2220/20; H01M 10/48; Y02E 60/10
USPC ....................................................... 320/112
See application file for complete search history.

(56) References Cited

U.S. PATENT DOCUMENTS

| | | | | |
|---|---|---|---|---|
| 6,100,670 A | * | 8/2000 | Levesque | H02J 7/0036 320/137 |
| 6,924,621 B2 | * | 8/2005 | Jabaji | H02J 7/0031 320/117 |
| 7,479,894 B2 | * | 1/2009 | Song | H02H 7/18 429/61 |
| 8,022,661 B1 | * | 9/2011 | Bauer | H01M 10/052 320/101 |

(Continued)

FOREIGN PATENT DOCUMENTS

| | | | | |
|---|---|---|---|---|
| EP | 3982139 A1 | * | 4/2022 | ........... G01R 23/005 |
| GB | 2534314 A  | * | 7/2016 | ............ B60L 3/0046 |
| KR | 20180087013 A | * | 8/2018 | .......... H02J 7/00047 |

*Primary Examiner* — M Baye Diao
(74) *Attorney, Agent, or Firm* — MCDONNELL BOEHNEN HULBERT & BERGHOFF LLP

(57) ABSTRACT

An apparatus for protecting a battery pack is configured to release reverse connection of the battery pack by detecting the reverse connection of the battery pack even in a case where the reverse connection of the battery pack is not detected through a battery pack controller.

8 Claims, 2 Drawing Sheets

(56) References Cited

U.S. PATENT DOCUMENTS

| | | | | |
|---|---|---|---|---|
| 8,355,231 B2* | 1/2013 | Lee | .................... | H02J 7/00308 |
| | | | | 361/104 |
| 8,911,899 B2* | 12/2014 | Lim | ........................ | B60L 50/64 |
| | | | | 429/163 |
| 9,108,521 B2* | 8/2015 | Jung | ..................... | H01M 10/48 |
| 11,621,441 B2* | 4/2023 | Aikens | ................ | H01M 10/425 |
| | | | | 429/322 |
| 11,938,825 B2* | 3/2024 | Sukhatankar | .......... | B60K 6/485 |
| 2005/0110462 A1* | 5/2005 | Ullrich | ................. | H02J 7/0068 |
| | | | | 320/128 |
| 2007/0188138 A1* | 8/2007 | Kobayashi | ............ | H02J 7/0014 |
| | | | | 320/119 |
| 2011/0250484 A1* | 10/2011 | Meng | ................... | H01M 50/51 |
| | | | | 173/217 |
| 2013/0002016 A1* | 1/2013 | Furukawa | ............. | H02J 7/0016 |
| | | | | 307/43 |
| 2013/0201587 A1* | 8/2013 | Baek | .................... | G01R 31/396 |
| | | | | 324/426 |
| 2013/0308239 A1* | 11/2013 | Yamada | ................ | H02J 7/0029 |
| | | | | 361/93.1 |

* cited by examiner

- Prior Art -

APPARATUS FOR PROTECTING BATTERY PACK

CROSS REFERENCE TO RELATED APPLICATIONS

The present application claims priority to Korean Patent Application No. 10-2021-0133565, filed Oct. 8, 2021, the entire contents of which are incorporated herein for all purposes by this reference.

BACKGROUND

Field of the Disclosure

The present disclosure relates to an apparatus for protecting a battery pack. More particularly, the present disclosure relates to an apparatus for protecting a battery pack, which is configured to prevent explosion of the battery pack due to reverse connection.

Description of the Related Art

Generally, a vehicle is equipped with a battery in order to supply power to various electric components or devices in the vehicle. In many cases, a battery pack configured to include a plurality of battery cells in a pack is used as the battery.

When such a battery pack is installed on the vehicle, a situation in which the battery pack is reversely connected to a component to which the battery pack is connected may occur due to any error during battery connection operation.

For charging, a vehicle battery pack is connected to a power conversion device in the vehicle. Where the battery pack has been reversely connected to the power conversion device for a long time, there is a danger of fire and explosion.

Accordingly, in order to cope with such an abnormal situation as a reverse connection to the power conversion device, the battery pack is provided with an apparatus for protecting the battery pack.

FIG. 3 attached hereto illustrates a conventional battery pack protecting apparatus.

As illustrated in FIG. 3, the conventional battery pack protecting apparatus is provided in a battery pack 10. The battery pack 10 includes a battery cell 11, a latch relay 12 connected to a positive end of the battery cell 10, and a battery pack controller 13 connected to the positive end and a negative end of the battery cell 11.

The battery pack controller 13 senses voltages of the positive end and the negative end of the battery cell 11. Based on the sensed voltage values, the battery pack controller 13 determines whether the battery pack 10 is reversely connected to the power conversion device. When the reverse connection of the battery pack 10 is detected, the battery pack controller 13 turns off the latch relay 12, thereby releasing the reverse connection of the battery pack 10.

However, the reverse connection of the battery pack 10 may not be detected where the battery pack controller 13 is reset or malfunctions, thereby causing a situation wherein the latch relay 12 is not turned off.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide an apparatus for protecting a battery pack, the apparatus being configured to detect reverse connection of the battery pack and to release the reverse connection of the battery pack even though the reverse connection of the battery pack is not detected by means of the battery pack controller.

The present disclosure is not limited to the above-described objective, and other objectives of the present disclosure not mentioned herein will be clearly understood by those of ordinary knowledge in the art on the basis of the following description.

In order to achieve the objective of the present disclosure, an apparatus for protecting a battery pack includes a battery pack including a negative terminal, a plurality of positive terminals, and a plurality of battery cells, the negative and positive terminals being connected to a power conversion device, and the plurality of battery cells being configured to be charged by power supplied through the power conversion device, a plurality of latch relays connecting the plurality of positive terminals and the plurality of battery cells in such a manner that connection of the positive terminals and the battery cells can be individually released, a reverse connection releasing unit configured to determine whether the battery pack has been reversely connected to the power conversion device, and when it is determined that the battery pack has been reversely connected to the power conversion device, to generate a reverse connection detection signal, and to transmit a turn-off signal to the plurality of latch relays, and a battery pack controller configured to transmit the turn-off signal to the plurality of latch relays when the reverse connection detection signal is applied from the reverse connection releasing unit.

According to an embodiment of the present disclosure, the reverse connection releasing unit includes a reverse connection detector configured to determine whether the battery pack has been reversely connected to the power conversion device, based on a voltage of the negative terminal and voltages of the positive terminals, and when it is determined that the battery pack has been reversely connected to the power conversion device, to output the reverse connection detection signal, and a relay controller configured to execute turn-off of the latch relays when the reverse connection detection signal is applied to an input terminal thereof, by transmitting the turn-off signal to the plurality of latch relays.

The reverse connection detector is configured to output the reverse connection detection signal when 0 V is applied to at least any one of the plurality of positive terminals and an output voltage of the power conversion device is applied to the negative terminal.

The reverse connection detector is configured not to output the reverse connection detection signal when an output voltage of the power conversion device is applied to the plurality of positive terminals and 0 V is applied to the negative terminal.

The reverse connection detector includes a first switching element configured to be connected to negative ends and positive ends of the battery cells connected to each other in parallel, and to turn on a second switching element when an output voltage of the power conversion device is applied to the negative ends of the battery cells and 0 V is applied to a positive end of at least one of the battery cells, and the second switching element configured to apply the reverse connection detection signal to the relay controller when the second switching element is turned on by the first switching element.

The first switching element is an NPN transistor including first base terminals to which the negative ends of the battery cells are connected, first ejector terminals connected to the positive ends of the battery cells through a diode, and a first collector terminal connected to a second base terminal of the second switching element.

The second switching element is a PNP transistor including the second base terminal connected to the first collector terminal, a second ejector terminal connected to a regulator, to which the reverse connection detection signal is applied from the regulator, and a second collector terminal connected to the relay controller.

The battery pack controller is connected to the reverse connection detector to receive the reverse connection detection signal transmitted from the reverse connection detector.

The present disclosure is advantageous in that the latch relay is configured to be turned off in a dual manner through both a reverse connection releasing unit and a battery pack controller, so that the latch relay can be turned off through the reverse connection releasing unit even in a situation where the battery pack controller cannot turn off the latch relay.

According to the present disclosure, the reverse connection of the battery pack can be released without regard to failure of the battery pack controller, thereby being capable of preventing fire and explosion which may occur when the reverse connection of the battery pack is maintained for a long time.

The present disclosure is not limited to the effects described above, and other effects of the present disclosure not mentioned herein could be clearly understood by those skilled in the art on the basis of the following description.

BRIEF DESCRIPTION OF THE FIGURES

The above and other objectives, features, and other advantages of the present disclosure will be more clearly understood from the following detailed description when taken in conjoint with the accompanying drawings, in which.

DETAILED DESCRIPTION

Unless the context clearly indicates otherwise, it will be understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure should not be construed as limiting the present disclosure but should be understood that the embodiments include all modifications, equivalents, and replacements falling in the concept and technical scope of the present disclosure.

It will be also understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Further, it will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

Hereinafter, embodiments of the present disclosure will be described in detail with reference to the accompanying drawings. Those represented in the attached drawings are illustrated in order to easily explain the embodiments of the present disclosure and they may thus be different from the configuration actually embodied.

Figure 1:
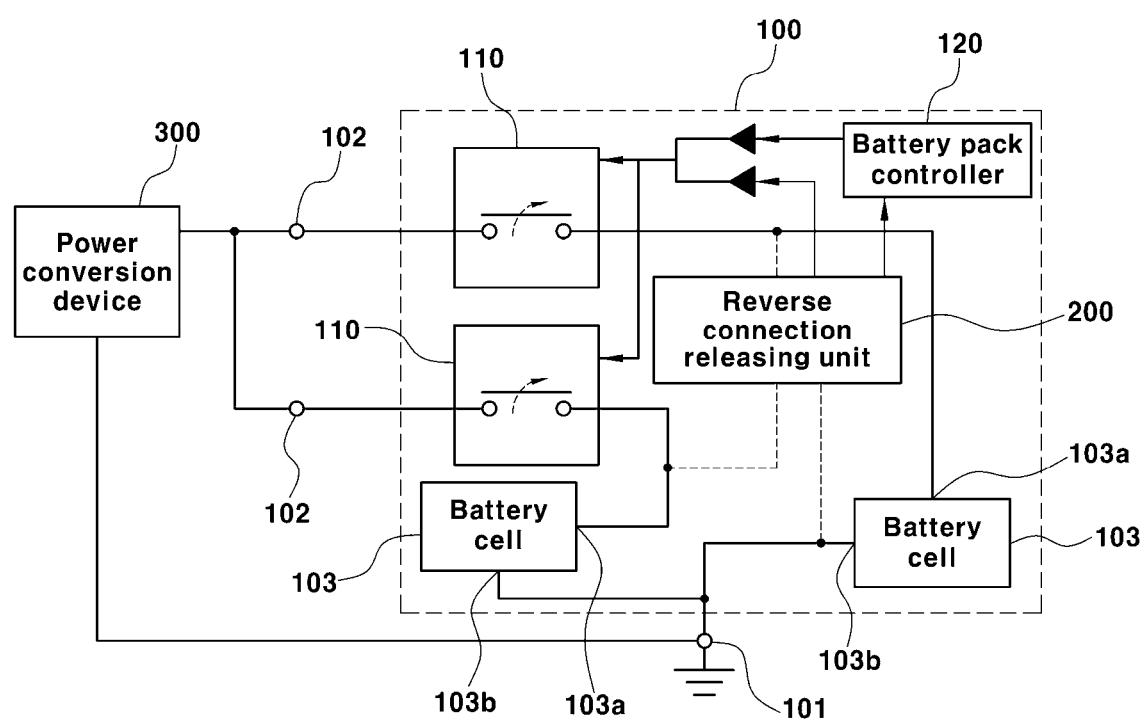
FIG. 1 is a diagram illustrating a battery pack protecting apparatus in accordance with an embodiment of the present disclosure.
Figure 2:
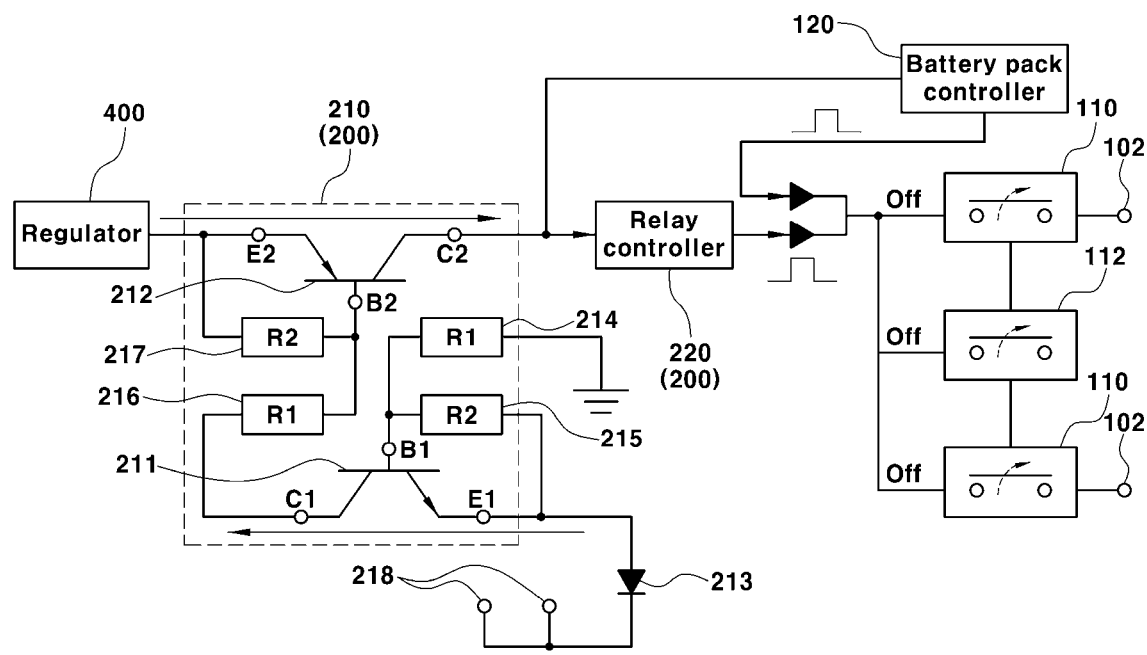
FIG. 2 is a diagram illustrating in more detail the battery pack protecting apparatus in accordance with an embodiment of the present disclosure.
Figure 3:
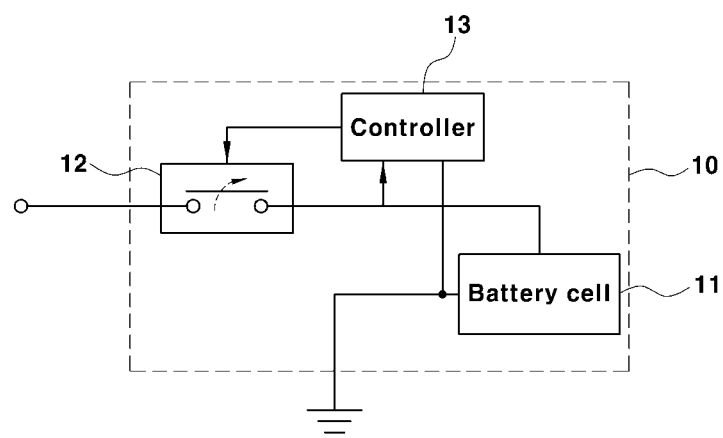
FIG. 3 is a diagram illustrating a conventional battery pack protecting apparatus.

FIG. 1 is a diagram illustrating a battery pack protecting apparatus in accordance with an embodiment of the present disclosure, and FIG. 2 is a diagram illustrating in more detail the battery pack protecting apparatus in accordance with an embodiment of the present disclosure.

As illustrated in FIG. 1, a battery pack 100 of the present disclosure is configured to include a negative terminal 101, a plurality of positive terminals 103, and a plurality of battery cells 103, the negative and positive terminals being connected to a power conversion device 300, and the plurality of battery cells 103 being charged by power supplied through the power conversion device 300.

The battery pack 100 is installed in a vehicle. In addition to the battery pack 100, at least one or more other battery packs may be installed in the vehicle. The battery pack 100 may be charged by the battery cells 103 charged through another battery pack installed in the vehicle. For example, the battery cells 103 may be charged from a high voltage battery pack in the vehicle.

The power conversion device 300 is configured to convert power output from the high voltage battery into a low voltage and apply the power to the battery pack 100. The power applied to the battery pack 100 through the power conversion device 300 charges the battery cells 103. The battery cells 103 are connected to each other in parallel and are secondary lithium battery cells which can be charged and discharged.

When the battery pack 100 is normally connected to the power conversion device 300, positive terminals 102 of the battery pack 103 are connected to an output terminal (that is, a positive terminal) of the power conversion device 300, and the negative terminal 101 of the battery pack 100 is connected to a negative terminal of the power conversion device 300.

In addition, where the battery pack 100 is abnormally connected to the power conversion device 300, the negative terminal 101 of the battery pack 100 is connected to the output terminal of the power conversion device 300, and at least one of the positive terminals 102 of the battery pack 100 is connected to the negative terminal of the power conversion device 300.

That is, where the battery pack 100 is reversely connected to the power conversion device 300, at least one of the plurality of the positive terminals 102 is connected to the negative terminal of the power conversion device 300.

Where the battery pack 100 is reversely connected to the power conversion device 300, an output voltage of the power conversion device 300 is applied to the negative terminal 101, and 0 V is applied to at least one of the plurality of the positive terminals 102.

Accordingly, where the battery pack 100 is reversely connected to the power conversion device 300, the output voltage of the power conversion device 300 is sensed at the negative terminal 101, and 0 V is sensed at least one of the plurality of the positive terminals 102.

Where the battery pack 100 has been reversely connected to the power conversion device 300 for a long time, fire and explosion may occur. In this regard, it is necessary to release the reverse connection to the power conversion device 300 immediately upon reverse connection of the battery pack 100 to the power conversion device 300.

In order to release the reverse conversion to the power conversion device 300, the battery pack 100 is configured to include a plurality of latch relays 110, a reverse connection releasing unit 200, and a battery pack controller 120.

The plurality of latch relays 110 are arranged between each of the battery cells 103 and each of the positive terminals 102 and connect the battery cells 103 and the positive terminals 102 in such a manner that connections between the battery cells 103 and the positive terminals 102 can be released. In other words, the plurality of latch relays 110 connect the plurality of battery cells 103 and the plurality of positive terminals 102 to each other in such a manner that connections of the plurality of battery cells 103 and the plurality of positive terminals 102 can be individually released. That is, the battery cells 103 and the positive terminals 102 are connected in such a manner as to be electrically disconnected by means of the latch relays 110.

The latch relay 110 is directly connected to a positive end 103a of the battery cell 103. When the latch relay 110 is turned on, the battery cell 103 is connected the positive terminal 102, and when the latch relay is turned off, connection of the battery cell 103 and the positive terminal 102 is released.

The positive end 103a of the battery cell 103 is connected to the positive terminal 102 of the battery pack 100 through the latch relay 110, and a negative end 103b of the battery cell 103 is directly connected to the negative terminal 101 of the battery pack 100 through an electrical connection line including wire, etc.

The reverse connection releasing unit 200 is configured to determine whether the battery pack 100 has been reversely connected to the power conversion device 300, on the basis of a voltage of the negative terminal 101 and voltages of the positive terminals 102, and when it is determined that the battery pack 100 has been reversely connected to the power conversion device 300, to generate a reverse connection detection signal, thereby executing turn-off of the latch relays 110.

In addition, when the reverse connection releasing unit 200 generates a reverse connection detection signal, the battery pack controller 120 senses and determines reverse connection of the battery pack, based on the reverse connection detection signal. The battery pack controller 120 is configured to turn off the latch relays 110 upon receiving the reverse connection detection signal.

Here, reverse connection of the battery pack 100 implies that the battery pack 100 is reversely connected to the power conversion device 300.

As illustrated in FIG. 2, the reverse connection releasing unit 200 may be configured to include a reverse connection detector 210 and a relay controller 220.

The reverse connection detector 210 is configured to determine whether the battery pack 100 has been reversely connected to the power conversion device 300, based on a voltage of the negative terminal 101 and voltages of the positive terminals 102, and when it is determined that the battery pack 100 has been reversely connected to the power conversion device 300, to output a reverse connection detection signal.

The relay controller 220 is configured to turn off the latch relays 110 by transmitting a turn-off signal to the latch relays 110 upon receiving the reverse connection detection signal output by the reverse connection detector 210.

Here, the turn-off signal is a signal transmitted to the latch relays 110 so as to turn off the latch relays 110. The turn-off signal may be a predetermined current applied to a coil element of the latch relay 110. For example, the turn-off signal may be a signal having a single waveform in which pulse is maintained for a predetermined period of time.

The reverse connection detector 210 is configured to generate and output the reverse connection detection signal when 0 V is sensed at least one of the positive terminals 102 of the battery pack 100 and an output voltage of the power conversion device 300 is sensed at the negative terminal 101.

The reverse connection detector 210 is also configured not to output the reverse connection detection signal when the output voltage of the power conversion device 300 is sensed at all of the positive terminals 102 of the battery pack 100 and 0 V is sensed at the negative terminal 101 of the battery pack 100.

As illustrated in FIG. 2, the reverse connection detector 210 may be configured to include a first switching element 211, a second switching element 212, and a plurality of resistance elements 214, 215, 216, and 217.

The first switching element 211 is connected to both of the negative ends 103b and the positive ends 103a of the battery cells 103 connected to each other in parallel. The first switching element 211 is turned on when an output voltage of the power conversion device 300 is applied to the negative ends 103b of the battery cells 103, and 0 V is applied to a positive end 103a of at least one of the battery cells 103.

The first switching element 211 is turned on by the output voltage of the power conversion device 300. The first switching element 211 is configured to turn on the second switching element 212 when the first switching element 211 is turned on by the output voltage of the power conversion device 300.

For example, the first switching element 211 may be an NPN transistor. Specifically, the first switching element 211 may be an NPN transistor having first base terminals B1 connected to the negative ends 103b of the battery cells 103, first ejector terminals E1 connected to the positive ends 103a of the battery cells 103, and a first collector terminal C1 connected to the second switching element 212. At this time, the first ejector terminals E1 are connected to the positive ends 103a of the battery cells 103 through a diode 213. In addition, the first base terminals B1 are connected to the negative ends of the battery cells 103 and the negative terminal of the battery pack 100 through the first resistance element 214.

The first switching element 211 is turned on when the output voltage of the power conversion device 300 is applied to the first base terminal B1. That is, the first switching element 211 is turned on when the output voltage of the power conversion device 300 is applied to the negative ends 103b of the battery cells 103. The first switching element 211 applies a reverse voltage of the diode 213 to the second switching element 212 when the first switching element 211 is turned on through the output voltage of the power conversion device 300.

The second switching element 212 is configured to transmit a reverse connection detection signal to the relay controller 220 when the second switching element 212 is turned on by the first switching element 211.

For example, the second switching element 221 may be a PNP transistor. Specifically, the second switching element 212 may be a PNP transistor having a second base terminal B2 connected to the first collector terminal C1 of the first switching element 211, a second ejector terminal E2 connected to a regulator 400, and a second collector terminal C2 connected to the relay controller 220. At this time, the second base terminal B2 is connected to the first collector terminal C1 of the first switching element 211 through the third resistance element 216. That is, the second base terminal B2 is connected to the first collector terminal C1, placing the third collector element 216 therebetween.

The second switching element 212 is turned on when a reverse voltage of the diode 213 is applied to the second base terminal B2. The second switching element 212 transmits the output voltage of the regulator 400 to the relay controller 220 when the second switching element 212 is turned on through the reverse voltage of the diode 213.

Here, the output voltage of the regulator 400 is maintained constantly at a predetermined voltage value. That is, the regulator 400 outputs a predetermined voltage without change.

The diode 213 is connected between the first ejector terminal E1 of the first switching element 211 and a cell positive connection terminal 218, and the cell positive connection terminal 218 is directly connected to the positive ends 103a of the battery cells 103.

The relay controller 220 generates a turn-off signal to execute turn-off of the latch relays 110 and transmits the turn-off signal to each of the latch relays 110 when a predetermined voltage is applied through the second switching element 212. Here, the predetermined voltage, that is, the output voltage of the regulator 400 is a reverse connection detection signal. The regulator 400 applies the reverse connection detection signal to the second ejector terminal E2.

The second collector terminal C2 of the second switching element 212 is connected to an input terminal of the relay controller 220. The battery pack controller 120 is also connected to the input terminal of the relay controller 220. In other words, the battery pack controller 120 is connected to the second collector terminal C2 of the second switching element 212. That is, the battery pack controller 120 is connected to the output terminal of the reverse connection detector 210 so as to receive the reverse connection detection signal.

When the reverse connection detection signal is applied to an input terminal of the relay controller 220 through the second switching element 212, the reverse connection detection signal is also applied to the battery pack controller 120.

When a predetermined voltage is applied, that is, the reverse connection detection signal is input, the battery pack controller 120 generates a turn-off signal to execute turn-off of the latch relays 110 and transmits the turn-off signal to each of the latch relays 110.

The latch relays 110 having received the turn-off signals applied from the relay controller 220 and the battery pack controller 120 are turned off by the turn-off signal, thereby releasing the reverse connection of the battery pack 100.

The latch relays 110 are individually provided with a terminal to which the turn-off signal is applied and a terminal to which a turn-on signal is applied. The latch relays 110 are normally turned off even though the turn-off signal of the relay controller 220 and the turn-off signal of the battery pack controller 120 are dually applied.

Meanwhile, the battery pack 100 according to an embodiment of the present disclosure may be configured to include auxiliary latch relays (refer to reference numeral 112 of FIG. 2). Referring to FIG. 2, where any one of the plurality of latch relays 110 is turned off, the auxiliary latch relay 112 is turned on.

As illustrated in FIG. 1, the battery pack 100 may be configured to include two battery cells 103 connected to each other in parallel. Where any one of the two battery cells 103 malfunctions, the latch relay connected to the out-of-order battery cell is turned off. At this time, the auxiliary latch relay 112 is turned on, thereby allowing power of the battery cell which is normal, between the two battery cells 103, to be supplied to the power conversion device 300. The power of the normal battery cell is applied to the power conversion device 300 through the positive terminal 102. The battery cells 103 may malfunction due to overtemperature, overvoltage, etc.

Where the two battery cells 103 are both normal, the auxiliary latch relay 112 is maintained in an off state. In other words, the auxiliary latch relay 112 is maintained in an off state until before any one of the two battery cells 103 malfunctions.

The battery pack protecting apparatus of the present disclosure as described above is configured to turn off the latch relays in a dual manner through the reverse connection releasing unit 200 and the battery pack controller 120 and can thus turn off the latch relays 110 through the reverse connection releasing unit 200 even when the battery pack controller 120 fails to turn off the latch relays 110 due to failure or resetting, etc.

In addition, the battery pack protecting apparatus of the present disclosure can turn off the latch relays 110 through the battery pack controller 120 even when the relay controller 220 of the reverse connection releasing unit 220 fails to turn off the latch relays 110.

As described above, the battery pack protecting apparatus of the present disclosure is capable of turning off the latch relays 110 immediately after reverse connection of the battery pack 100 occurs when either of the battery pack controller 120 or the latch controller 220 is in a normal state, thereby releasing the reverse connection of the battery pack 100, and also preventing fire and explosion of the battery pack which may occur when the reverse connection of the battery pack 100 is maintained for a long time.

Although the present disclosure was described with reference to specific embodiments shown in the drawings, unless otherwise defined, all terms including technical and scientific terms used herein have the same meaning as commonly understood by one of ordinary skill in the art to which this disclosure belongs. In addition, the scope of the present disclosure is not limited to the embodiments described above, and various modifications and improvements by those skilled in the art using the basic concepts of the present disclosure also fall in the protection scope of the present disclosure.

The invention claimed is:

1. An apparatus for protecting a battery pack, comprising:
   a battery pack including a negative terminal, a plurality of positive terminals, and a plurality of battery cells, the negative and positive terminals being connected to a power conversion device, and the plurality of battery cells being configured to be charged by power supplied through the power conversion device;
   a plurality of latch relays connecting the plurality of positive terminals and the plurality of battery cells so that connection of the positive terminals and the battery cells can be individually released;
   a reverse connection releasing unit configured to determine whether the battery pack has been reversely connected to the power conversion device, and when it is determined that the battery pack has been reversely connected to the power conversion device, to generate a reverse connection detection signal, and to transmit a turn-off signal to the plurality of latch relays; and
   a battery pack controller configured to transmit the turn-off signal to the plurality of latch relays when the reverse connection detection signal is applied from the reverse connection releasing unit.

2. The apparatus of claim 1, wherein the reverse connection releasing unit comprises:
   a reverse connection detector configured to determine whether the battery pack has been reversely connected to the power conversion device, based on a voltage of the negative terminal and voltages of the positive terminals, and when it is determined that the battery pack has been reversely connected to the power conversion device, to output the reverse connection detection signal; and
   a relay controller configured to execute turn-off of the latch relays when the reverse connection detection signal is applied to an input terminal thereof, by transmitting the turn-off signal to the plurality of latch relays.

3. The apparatus of claim 2, wherein the reverse connection detector is configured to output the reverse connection detection signal when 0 V is applied to at least any one of the plurality of positive terminals and an output voltage of the power conversion device is applied to the negative terminal.

4. The apparatus of claim 2, wherein the reverse connection detector is configured not to output the reverse connection detection signal when an output voltage of the power conversion device is applied to the plurality of positive terminals and 0 V is applied to the negative terminal.

5. The apparatus of claim 2, wherein the reverse connection detector comprises:
   a first switching element configured to be connected to negative ends and positive ends of the battery cells connected to each other in parallel, and to turn on a second switching element when an output voltage of the power conversion device is applied to the negative ends of the battery cells and 0 V is applied to a positive end of at least one of the battery cells; and
   the second switching element being configured to apply the reverse connection detection signal to the relay controller when the second switching element is turned on by the first switching element.

6. The apparatus of claim 5, wherein the first switching element is an NPN transistor comprising:
   first base terminals to which the negative ends of the battery cells are connected;
   first ejector terminals connected to the positive ends of the battery cells through a diode; and
   a first collector terminal connected to a second base terminal of the second switching element.

7. The apparatus of claim 6, wherein the second switching element is a PNP transistor comprising:
   the second base terminal connected to the first collector terminal;
   a second ejector terminal connected to a regulator, to which the reverse connection detection signal is applied from the regulator; and
   a second collector terminal connected to the relay controller.

8. The apparatus of claim 2, wherein the battery pack controller is connected to the reverse connection detector to receive the reverse connection detection signal transmitted from the reverse connection detector.

* * * * *